Sept. 14, 1954  A. A. WICKLAND  2,688,943
SPARK ARRESTER AND SMOKE SUPPRESSOR
Filed Nov. 6, 1951  2 Sheets-Sheet 1
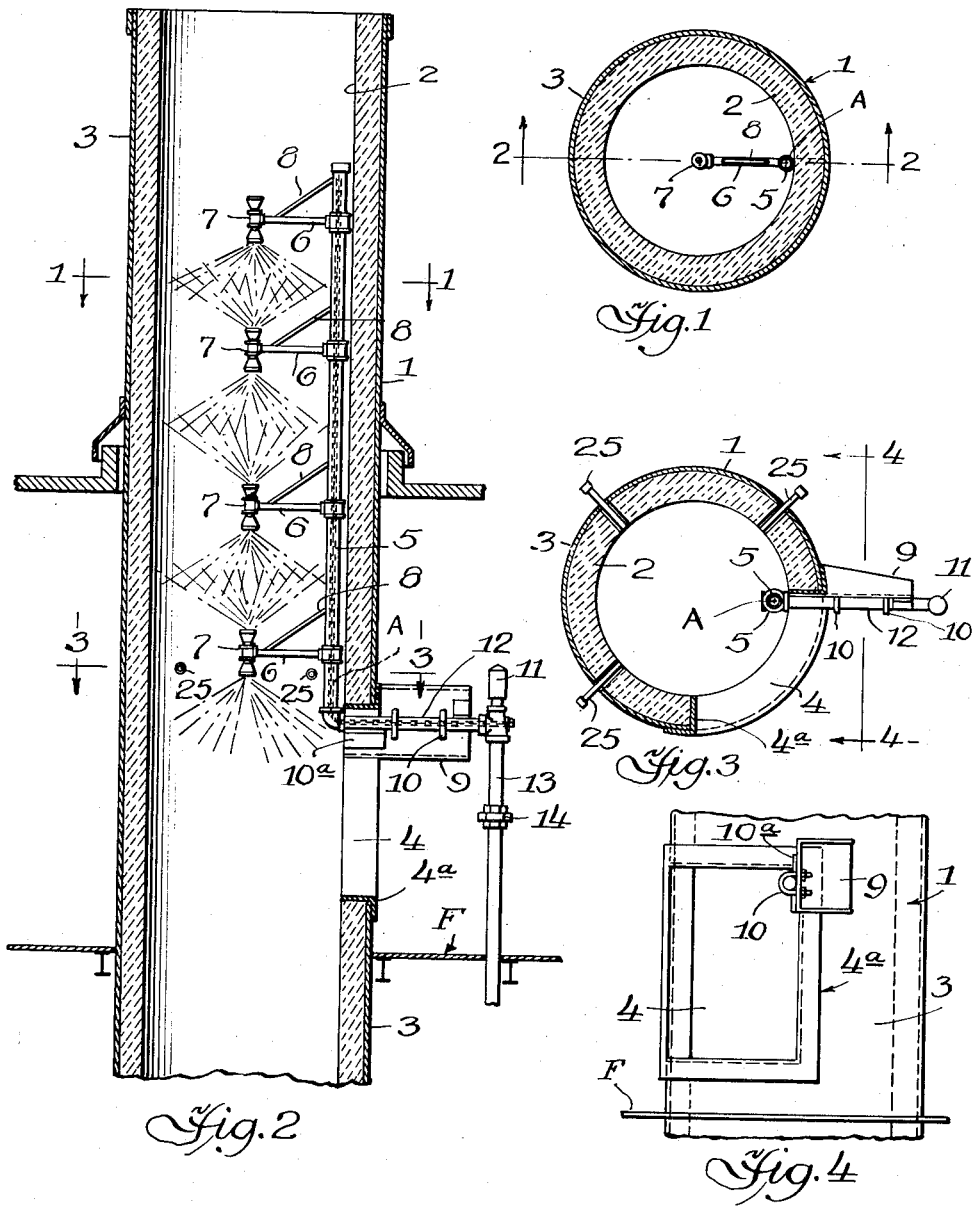
INVENTOR.
Algot A. Wickland

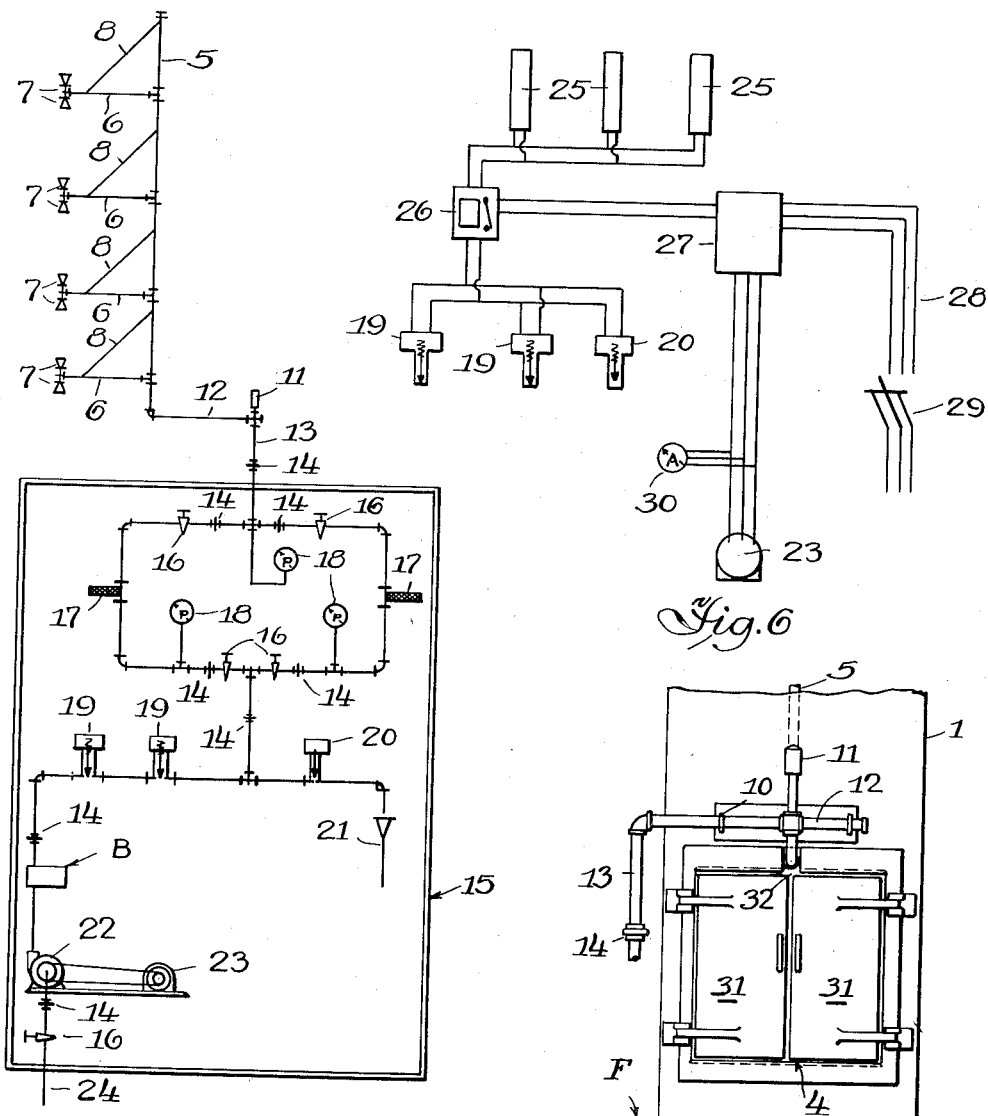

Patented Sept. 14, 1954

2,688,943

UNITED STATES PATENT OFFICE 2,688,943

SPARK ARRESTER AND SMOKE SUPPRESSOR

Algot A. Wickland, Chicago, Ill.

Application November 6, 1951, Serial No. 255,039

6 Claims. (Cl. 110—119)

The present invention relates to a novel spark arrestor and smoke suppressor and particularly such a construction that is applicable to new and existing cupola melting furnaces. It embodies the application of atomized water spray to contact or impinge and intermix with the effluent gases at elevated temperatures, whereby a large amount of the spray will form into steam. The velocity of escaping stack gases is generally quite high, varying from approximately 10 to 50 feet per second. Consequently the time of exposure of the gas to the water spray or vapor is only a fraction of a second, and the total time of passage through the stack is generally less than one second. Since the element of time is paramount in quenching incandescent cinders and saturating carbonaceous minute particles held in suspension by the effluent gases, the present assembly and arrangement of a plurality of spray nozzles, one above the other within the stack, presents a most effective means and manner of arresting the sparks and other particles carried by the waste gases and suppressing the smoke which emanate from the stack, and is an outstanding improvement over previous types of arresting devices.

One object of my invention is to provide a highly efficient means and mechanism to quickly cool the effluent waste gases escaping through the stack to the atmosphere, thereby reducing the gas temperature, volume, velocity, natural stack draft as well as the influx of excess air through the charging door.

Another important object of my invention is to provide simple and direct means to quench incandescent carbon particles carried in suspension by the waste gas, and to subject fly ash and minute carbonaceous matter to moisture and vapor, thereby increasing their weight and lessening the tendencies for such particles to be carried in supension long distances by the air currents.

A further important object of my invention is to supply an admixture of steam to the effluent gas escaping to the atmosphere whereby this gas becomes saturated with moisture which reduces the volume, lowers the temperature and increases the specific weight. This results in the waste gases and air borne particles being quickly dissipated after leaving the stack.

A further object of my invention is to provide a device which is entirely automatic in its operation, thereby eliminating the human factor. As the application of water spray on refractory furnace lining at high temperature is destructible to the lining, the present invention comprehends controlling the atomized spray nozzles by means of thermostats or thermostatic controls set to start operation when the temperature of the lining reaches approximately 300° F. and to close and stop operation when the temperature drops below this minimum or range.

Another object of my invention is to provide a novel spark arresting device detachably mounted within the cupola furnace stack and which can be readily removed for cleaning or replacement. This removal or replacement can be easily accomplished by the simple expedient of disconnecting the riser from the supply pipe and removing but two U bolts from the supporting bracket whereby to free the riser and nozzle assembly and permit manual removal or replacement in a convenient manner.

In addition to the preceding important objectives, my invention provides means to suppress air borne carbonaceous matter and prevent its distribution over long distances. The accumulation of minute carbon particles will take place near and around the cupola furnace stack. Should this prove objectionable the cinders and fly ash can be collected by installing a drum at the top of the cupola having bottom outlets and hydraulic means for removing and conveying such material to some desired depository elsewhere.

The normal operation of a cupola furnace starts by lighting a bed of coke placed at the bottom of the cupola. When this burns uniformly a metal charge is added and this is followed by a charge of coke. This process of adding alternate charges of coke and metal or melting stock is repeated until the cupola is filled to approximately the charging floor, the coke and melting stock being charged through a door conveniently placed at the charging floor. When the cupola is fully charged, air under pressure from a blower enters the melting zone to support combustion.

The melting process creates a large volume of high temperature gases, which escape through the stack above the charging floor. As melting proceeds, alternate charges of coke and melting stock are added. The instant a charge is dumped into the cupola large volumes and showers of coke dust, smoke and iron oxide are liberated and are carried through the stack to the atmosphere by the issuing waste gases. These particles are then carried in suspension and the issuing smoke contaminates the surrounding atmosphere with the cinders and fly ash carried a considerable distance from the cupola in accordance with the prevailing wind and direction.

At the close of the melting period the cupola bottom is opened and the contents consisting of incandescent coke, slag and metal are dropped to the floor. This operation gives rise to a large volume of sparks and cinders, which are carried with the waste gases to the atmosphere.

The above objectionable features of the normal operation of a cupola are completely or substantially completely eliminated by means of the present invention which quenches the cinders and sparks, suppresses the air-borne carbonaceous particles and other matter and cools the effluent gases, thereby lessening the volume of escaping fumes.

Trouble free and most effective operation of this novel device is accomplished by dependable control. The water spray is not to be applied until the refractory lining inside the stack has reached a minimum temperature of about 300° F. and the spray continues uninterruptedly until the melting period is completed and the temperature within the stack falls below such predetermined minimum temperature. The residual heat will evaporate the last trace of moisture thereby preventing spalling of the fire-brick lining. The same condition holds good in starting. The object of the automatic control is to start and stop the spray only when it reaches or falls below a certain temperature.

To insure positive action in starting and stopping multiple thermostats, solenoid valves and strainers are provided as well as the automatic opening and closing of the drain valve to thereby prevent freezing of exposed piping.

The novel construction and arrangement of the spray nozzle in tiers, one above the other, is for the express purpose of increasing the exposure and of cooling the gases in stages, thereby reducing the volume and temperature, quenching the red hot cinders and saturating the fly ash and soot with moisture. By treating the gases and particles carried in suspension in the manner outlined, gravity plays a part in lessening buoyancy and causing the discharged particles to descend a short distance from the stack.

Figure 1 is a view in horizontal cross section of a cupola stack taken in a plane represented by the line 1—1 of Fig. 2 and equipped with the present invention.

Fig. 2 is a view in vertical cross section taken longitudinally through the cupola stack and showing the piping and spray nozzle assembly, the view being taken approximately on the line 2—2 of Fig. 1.

Fig. 3 is a view in horizontal cross section taken on the line 3—3, Fig. 1, and showing the thermostats and piping supporting bracket.

Fig. 4 is a fragmentary view part in elevation and part in horizontal cross section, the view being taken on line 4—4 and showing the charging door and bracket for supporting the spray assembly piping.

Fig. 5 is a diagrammatic view showing the general arrangement of the piping system and controls.

Fig. 6 is a diagrammatic layout of the thermostats, solenoid valves and motor electrical connections.

Fig. 7 is a view in front elevation of the hinged charging door for the cupola furnace.

Referring more particularly to the disclosure in the drawings in which like reference numerals refer to like elements in the various views, the upper section of a cupola furnace is known as the stack 1 which is lined with refractory brick 2 held in position by an encompassing boiler plate shell 3. A door or opening 4 at the charging floor F is provided for the deposit of coke and melting stock into the cupola. A vertical pipe or riser 5 is positioned inside and adjacent the lining 2 and is provided with a plurality of vertically spaced branch pipes 6 each having attached to its inwardly projecting end a threaded atomizing water spray assembly including a pair of oppositely projecting nozzles 7 arranged in pairs, as shown. Tie rods 8 serve to support the inwardly projecting end of each branch pipe 6 to the riser.

The lower portion of this pipe assembly is shown positioned adjacent an upper corner of the frame 4ᵃ of the door opening and adjacent a vertical door jamb of this frame, and it is held in fixed position by a bracket or support 9 securely fastened in any suitable manner to the shell 3. The nozzle assembly and piping are shown fastened to the bracket 9 by U bolts 10 and shelf angles 10ᵃ, thereby permitting convenient removal for necessary repairs or for replacement. A relief valve 11 is preferably provided adjacent the horizontal pipe section 12 and the connecting pipe section of a water supply system 13, the vertical pipe section being connected by a union 14 to the piping of the water supply system 13 which extends into a cabinet 15, see Fig. 5. This cabinet houses the control mechanism apparatus normally under lock and key.

If, for any reason, the water supply fails, the standpipe or riser 5, branches 6 and the atomizing nozzles 7 of the spray nozzle assembly may become subjected to high temperature, and being weakened by the heat may bend and fall. To avoid such happenings a chain A is inserted within the large standpipe or riser to prevent it from falling in the stack and inflicting possible injury to the men working below preparing the cupola for the next heat. This chain is attached at its upper end to the cap at the upper end of the standpipe or riser 5 and at its other end to the T at the outer end of the pipe section 12.

The standpipe or riser 5 can be readily removed or replaced by merely disconnecting the pipe 12 and removing the two U bolts 10 from the supporting bracket 9 and pipe section 12, after which tilting of the standpipe or riser 5 and its pipe section 12 permits their withdrawal through the opening of the door 4.

In Fig. 5 there is a diagrammatic view of the piping assembly including the spray nozzles 7 screwed on the branch pipes 6 which extend from the riser or standpipe 5, the relief valve 11, pipe section 12 and the pipe union 14. The piping of the water supply system 13 is shown connected to the control apparatus in the cabinet 15, through the gate valves 16 and strainers 17, and including pressure gauges 18 and a water or flow meter B. In this system is also provided a pair of solenoid valves 19 which are normally closed, a solenoid valve 20 normally open to drain the piping system and a drain pipe 21 leading to the sewer or waste. A centrifugal pump 22 driven by a motor 23 and connected through a gate valve 16 to the water inlet supply pipe 24 supplies water to the system.

Mounted within the furnace stack is provided plural thermostats or thermostat controls 25 (Figs. 2, 3 and 6) actuated by the temperature at the interior of the stack lining 2. These thermostats are adapted to actuate a relay 26 which controls operation of the solenoid valves 19 controlling the flow of water into the system 13 and a solenoid valve 20 for controlling the flow to the sewer or waste through the discharge pipe 21. These thermostats also control a magnetic motor starter 27 for controlling the operation of the motor 23 which in turn controls the operation of the centrifugal pump 22. Electric current is supplied to the electrical system by a main electrical supply circuit 28 through a suitable cut-out switch 29. In the motor circuit is provided an ammeter 30.

By providing a pair of solenoid valves 19 in the water supply system, provision is made against failure if but one such valve is employed and it fails to close. These solenoid valves prevent the passage of water into the standpipe or riser 5 until such time as the temperature at the stack lining 2 reaches a minimum of approximately 300° F. whereby the atomized spray from the nozzles 7 issues as or immediately forms steam vapor. When this minimum temperature is reached, the thermostats 25 actuate the solenoid valves 19 and allow water to flow into the standpipe or riser 5.

When the temperature at the lining 2 drops below approximately 300° F., the thermostats of thermostatic controls operate to close the valves 19 and open the valve 20 to cause any water in the system to pass to the drain. In order to prevent any destructive pressure from developing in the piping system at any time in the normal operation of the present invention the relief valve 11 is provided.

Gate valves 16 are shown in each branch line of the water supply system as shown in Fig. 5 to permit either the right-hand or left-hand branch to be closed, when required or desired. Each branch contains a pressure gauge 18 and a third pressure gauge 18 is provided at the juncture of these branches, so that a most accurate check of the pressures in the system is always afforded the operator.

Referring to Fig. 7, a majority of existing cupola furnaces are initially equipped with two hinged charging doors 31 and lined with firebrick 2, as related above. In such a construction and assembly, in order to properly support the vertical pipe 5 as previously described, it may become necessary to cut or form a slot 32 through the cupola shell 3 and door lintel, as shown. By this arrangement the piping will not interfere with the opening or closing of the charging doors, or with the men engaged in charging the cupola. Thus the present invention is admirably adapted for use in furnaces and stacks now in use, as well as form initial equipment for new furnaces and stacks of the type disclosed.

Each atomizing nozzle 7 is adapted to project an annular or circular and finely divided spray of steam into the interior of the stack at different elevations and in opposed directions whenever the temperature of the lining of the stack reaches a minimum temperature of approximately 300° F. whereby to prevent damage to the refractory lining 2.

From the above description and the disclosure in the drawings, it will be evident that the present invention comprehends a novel construction and arrangement for arresting the sparks emanating from a cupola melting furnace and for suppressing the smoke incident to its operation.

Having thus disclosed the invention, I claim:

1. In a cupola furnace, a stack therefor lined with a refractory material, a water supply pipe extending upwardly in said stack alongside the lining, a plurality of branch pipes each connected to said upright pipe and supplied thereby with water under pressure, an atomizing spray nozzle for each branch pipe disposed substantially centrally of the stack for spraying a uniform pattern of vapor in finely divided form from each nozzle through which the sparks, ash, smoke and other particles are carried in suspension by the exhaust gases leaving the stack, and automatically-actuated means controlled by the temperature of the refractory material lining of the stack for supplying water under pressure to the water supply pipe and from it to the branch pipes and nozzles when the temperature in the stack reaches an amount sufficient to cause the water as it leaves the atomizing spray nozzles to issue therefrom as steam that envelops the sparks, ash and other particles carried in suspension by the exhaust gases for quenching and arresting any such escaping particles, suppressing smoke and reducing the temperature, volume and velocity of the escaping gases.

2. In a cupola furnace having a stack provided with a refractory lining, means for readily and effectively quenching and arresting air-borne particles carried in the effluent gases as they pass through the stack and including a water supply pipe mounted in an upright position within the stack, a plurality of vertically spaced branch pipes in said stack emanating from said supply pipe and each provided with oppositely directed atomizing spray nozzles adapted to project a spray therefrom in a substantially uniform spray pattern, and thermostatically controlled mechanism actuated when the lining reaches a predetermined minimum temperature for controlling the supply of water to said nozzles whereby the spray issues from said nozzles only when the temperature in the stack causes said spray to issue in the form of steam.

3. In a cupola furnace having a stack with a refractory lining, means in said stack for readily and effectively quenching and arresting particles carried in suspension in the hot gases discharged through the stack and including a standpipe mounted within the stack, atomizing spray nozzles connected to the standpipe and disposed within the stack in equally spaced relation with the lining, means for supplying water under pressure to the standpipe, and thermostatic control means in the stack for controlling the supply of water to the standpipe whereby water is supplied thereto only when the degree of heat in the stack and the lining of the stack reaches a temperature sufficient to cause the water from the standpipe to issue as steam when ejected by the nozzles into the interior of the stack.

4. In a cupola furnace having a stack with a refractory lining, means in said stack for readily and effectively quenching and arresting particles carried in suspension in the hot gases discharged through the stack and including a standpipe mounted within the stack, atomizing spray nozzles connected to the standpipe and disposed within the stack in spaced relation with the lining, means for supplying water under pressure to the standpipe, and actuating means controlled by the temperature in the stack for supplying water to the nozzles only when the temperature of the lining of the stack reaches a minimum and the temperature in the stack is elevated sufficiently to vaporize the water and discharge it as steam as it is discharged from the nozzles.

5. In a cupola furnace having a stack provided with a refractory lining, means for quenching and arresting the sparks, fly ash, smoke and other foreign particles carried by the effluent gases and including a standpipe mounted within the stack adjacent the lining and having one or more atomizing spray nozzles disposed in spaced relation and substantially centrally of the lining and connected to the standpipe for receiving water therefrom, control means responsive to the temperature of the lining in the stack for controlling the passage of water to the standpipe whereby water is supplied thereto only when the temperature of the lining in the stack is approximately 300° F. or more, whereby the water supplied to the standpipe issues from the nozzles in the form of steam.

6. In a cupola furnace having a stack with a refractory lining, means in said stack for readily and effectively quenching and arresting particles carried in suspension in the hot gases discharged through the stack and including a standpipe mounted within the stack, atomizing spray nozzles connected to the standpipe and disposed within the stack in spaced relation with the lining, means for supplying water under pressure to the standpipe, and temperature-responsive and electrically controlled means for supplying water under pressure to the standpipe and nozzles only when the temperature of the lining reaches a predetermined minimum and the temperature in the stack is sufficiently high to vaporize the water issuing from the nozzles and discharge it as steam in the path of the hot exhaust gases and the sparks, fly ash and other foreign particles carried by the gases in suspension, whereby to prevent damage to the lining.

References Cited in the file of this patent

UNITED STATES PATENTS

| Number | Name | Date |
|---|---|---|
| 600,048 | Terrell | Mar. 1, 1898 |
| 1,450,176 | Hopkins | Apr. 3, 1923 |
| 1,857,416 | Von Eberhard | May 10, 1932 |
| 1,866,193 | Coutant | July 5, 1932 |
| 2,213,310 | Gimenez et al. | Sept. 3, 1940 |
| 2,594,171 | Howell | Apr. 22, 1952 |

FOREIGN PATENTS

| Number | Country | Date |
|---|---|---|
| 12,317 | Great Britain | 1888 |
| 71,008 | Switzerland | May 26, 1915 |